(12) United States Patent
Richardson et al.

(10) Patent No.: US 11,097,695 B2
(45) Date of Patent: Aug. 24, 2021

(54) NON-CONTACT CLEANING SYSTEM

(71) Applicant: Waymo LLC, Mountain View, CA (US)

(72) Inventors: Kimberley Mae Richardson, Mountain View, CA (US); Peter Craig Lombrozo, Scotts Valley, CA (US); Felix Jose Alvarez Rivera, Tarzana, CA (US)

(73) Assignee: Waymo LLC, Mountain View, CA (US)

( * ) Notice: Subject to any disclaimer, the term of this patent is extended or adjusted under 35 U.S.C. 154(b) by 366 days.

(21) Appl. No.: 16/175,301

(22) Filed: Oct. 30, 2018

(65) Prior Publication Data

US 2020/0130652 A1 Apr. 30, 2020

(51) Int. Cl.
*B60S 1/54* (2006.01)
*B60S 1/60* (2006.01)
*B08B 5/02* (2006.01)

(52) U.S. Cl.
CPC .............. *B60S 1/544* (2013.01); *B08B 5/02* (2013.01); *B60S 1/60* (2013.01)

(58) Field of Classification Search
CPC ... B60S 1/544; B60S 1/60; B08B 5/00; B08B 5/02; G02B 27/06
USPC ............................................ 15/405; 359/507
See application file for complete search history.

(56) References Cited

U.S. PATENT DOCUMENTS

| 10,782,520 | B2* | 9/2020 | Crespo | A46B 13/02 |
|---|---|---|---|---|
| 2003/0155001 | A1 | 8/2003 | Hoetzer et al. | |
| 2008/0072393 | A1* | 3/2008 | Tanaka | A47L 1/02 |
| | | | | 15/250.03 |
| 2018/0015908 | A1 | 1/2018 | Rice | |
| 2018/0086316 | A1 | 3/2018 | Trebouet et al. | |
| 2018/0265048 | A1 | 9/2018 | Schmidt | |

FOREIGN PATENT DOCUMENTS

| CN | 206868696 U | 1/2018 | |
|---|---|---|---|
| CN | 107838109 A | 3/2018 | |
| EP | 1684920 B1 | 3/2007 | |
| KR | 20180108024 A | 10/2018 | |
| WO | 2017191033 A1 | 11/2017 | |
| WO | WO-2019029804 A1 * | 2/2019 | ......... G02B 27/0006 |

OTHER PUBLICATIONS

International Search Report and Written Opinion for Application No. PCT/US2019/058283 dated Feb. 19, 2020.

* cited by examiner

*Primary Examiner* — Orlando E Aviles
*Assistant Examiner* — Thomas Raymond Rodgers
(74) *Attorney, Agent, or Firm* — Botos Churchill IP Law

(57) ABSTRACT

This technology relates to a system for clearing sensors. The system may include an air knife configured to clear a sensor housing of debris. The air knife may be attached to a bearing comprising a bearing ring. The system may also include a motor, wherein the motor is configured to rotate the bearing ring around the sensor housing.

18 Claims, 13 Drawing Sheets

NON-CONTACT CLEANING SYSTEM

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous and semi-autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, condensation, etc., which can cause a buildup of debris and contaminants on these sensors. Typically, the sensors include a housing to protect the internal sensor components of the sensors from the debris and contaminants, but over time, the housing itself may become dirty. As such, the functions of the sensor components may be impeded as signals transmitted and received by the internal sensor components are blocked by the debris and contaminants.

SUMMARY

This technology generally relates to clearing sensors. An aspect of the technology may include a sensor clearing system. The sensor clearing system may include an air knife configured to clear a sensor housing of debris; a bearing comprising a bearing ring, wherein the air knife is attached to the bearing ring; and a motor, wherein the motor is configured to rotate the bearing ring around the sensor housing.

In some embodiments, the air knife includes: an input for receiving a pressurized fluid; and an output section for providing the pressurized fluid against the sensor housing. In some instances, the system may include a blower, wherein the blower provides the pressurized fluid to the input of the air knife. In some aspects the system may include a heater disposed between the air knife and the blower, wherein the heater heats the pressurized fluid.

In some embodiments, the bearing is an air bearing further comprising a static ring. In some instances the bearing ring is positioned on the static ring. In some aspects one or more friction wheels may be in contact with the bearing ring, wherein the motor is configured to rotate the one or more friction wheels and the friction wheels rotate the bearing ring. In some instances, the static ring includes an input for receiving a pressurized fluid; and an output section for providing the pressurized fluid into a channel positioned between the bearing ring and static ring. In some instances, the channel includes one or more air grooves through which pressurized fluid leaks to maintain the pressurized fluid at a predetermined pressure. In some aspects the pressurized fluid is configured to separate the bearing ring from the static ring by lifting the bearing ring away from the static ring. In some instances a separation distance of the bearing ring and static ring is limited by one or more blocking elements. In some aspects the air knife includes an input for receiving a pressurized fluid, and wherein the input is connected to the channel to allow pressurized fluid to flow from the channel to the input.

In some embodiments the air knife is configured to clear the sensor housing by providing pressurized fluid against the sensor housing in a substantially downward direction relative to the face of the air knife.

In some embodiments the system further comprises a vehicle, wherein the sensor housing is mounted to the vehicle.

Another aspect of the technology includes a sensor clearing system comprising: an air knife configured to clear a sensor housing of debris; an air bearing comprising a bearing ring and a static ring, wherein the air knife is attached to the bearing ring; and a motor, wherein the motor is configured to rotate the bearing ring around the sensor housing.

In some instances, the system includes a blower, wherein the blower provides a pressurized stream of fluid to an input of the air knife. In some aspects, a heater is disposed between the air knife and the blower, wherein the heater heats the pressurized stream of fluid. In some instances, the bearing ring is positioned on the static ring. In some aspects one or more friction wheels may be in contact with the bearing ring, wherein the motor is configured to rotate the one or more friction wheels and the friction wheels rotate the bearing ring. In some embodiments the system further comprises a vehicle, wherein the sensor housing is mounted to the vehicle.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

This technology relates to clearing vehicle sensors of debris and contaminants to assure adequate operation. For instance, a sensor may include a housing to protect the internal sensor components from debris such as water, dirt, insects, and other contaminants, but the housing itself may become dirty over time. As such, the functions of the internal sensor components may be impeded as signals transmitted and received by the internal sensor components may be blocked by the debris. Debris may be cleared from a sensor by rotating a wiper around the sensor such that the housing is wiped clear by the wiper.

Figure 1A:
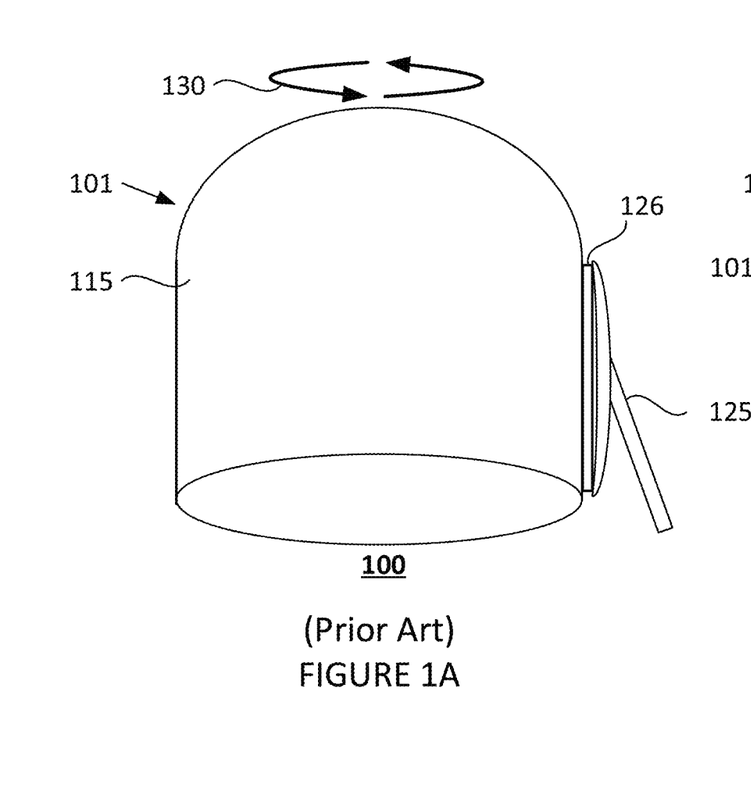
FIGS. 1A and 1B are illustrations of a sensor and wiper configuration in accordance with aspects of the disclosure.
Figure 1B:
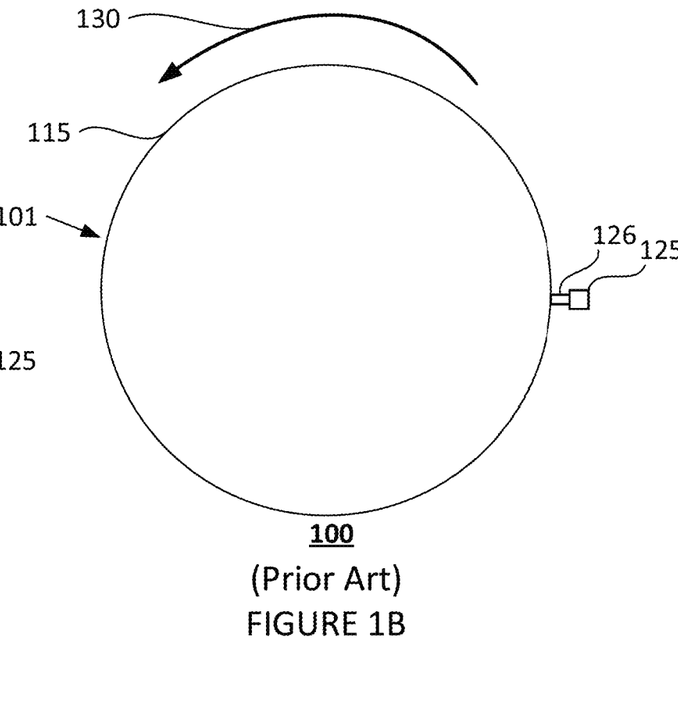

For instance, and as shown in the front and top-down views of a prior art sensor wiper system 100 in FIGS. 1A and 1B, respectively, a sensor housing 115 of sensor 101 may rotate in a first direction 130. A wiper blade 126 of wiper 125 may be positioned such that it wipes debris off the sensor housing 115 as the sensor housing rotates. However, the blade 126 may introduce a drag force onto the sensor housing, causing the sensor housing to slow down, which may impede operation of the sensor. Moreover, the blade 126 may need to be maintained or replaced after prolonged use, as the material which makes up the blade (e.g., rubber,) may wear down. Furthermore, the blades 126 are typically produced having a generic shape incapable of wiping irregularly shaped surfaces. Additionally, the blade 126 may cause wear marks, transfer blade material, or otherwise reduce the transparency of the sensor housing 115. Effective clearing of debris is especially important in situations where the sensor is being used to make decisions related to safety, such as in the case of an autonomous or semi-autonomous vehicle.

Figures 2A, 2B:
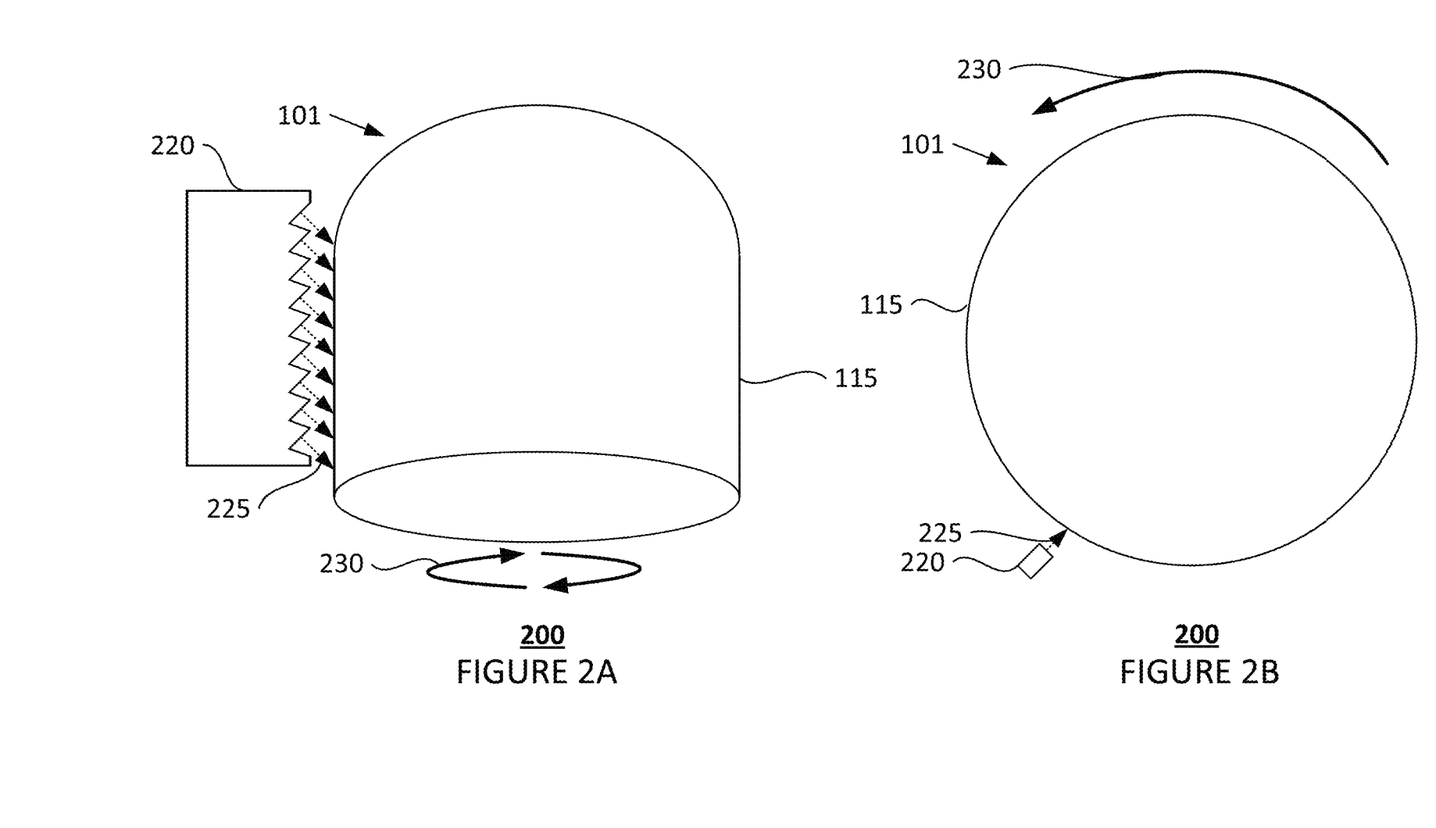
FIGS. 2A and 2B are illustrations of a sensor and air knife configuration in accordance with aspects of the disclosure.

To address these issues, the wiper may be replaced with an air knife, as shown in front and top-down views of a sensor clearing system 200 in FIGS. 2A and 2B. In this regard, the air knife 220 may clear debris on sensor housing 115 of sensor 101 by applying a stream of pressurized fluid 225 (represented by arrows) against the sensor housing 115. As further shown in FIGS. 2A and 2B, the air knife 220 may be rotated around the sensor 101 in a direction 230 while the stream of pressurized fluid 225 is applied against the sensor housing 115 to clear away the debris built up on the sensor housing 115.

The air knife may be constructed from one or more pieces of metal, plastic, or other such materials capable of withstanding high pressures. In this regard, the air knife may be configured such that it is capable of directing a received pressurized fluid to an output section of the air knife, where the pressurized fluid is then output. The pressurized fluid may be directed in a particular direction out from the output section of the air knife (e.g., at an angle to the surface of sensor housing 115 being cleaned).

The air knife may be attached to a bearing ring for rotation around a sensor. In this regard, the bearing ring may be rotated directly by a motor or via one or more frictions wheels. The one or more friction wheels may be mounted such that they are in contact with the bearing ring, and, when turned by the motor rotate, thereby causing the bearing ring to also rotate. The air knife may then rotate in the same direction as the bearing ring.

The bearing ring may be part of an air bearing also including a static ring. In this regard, the bearing ring may float above the static ring upon pressurized fluid being introduced between the bearing ring and static ring. The pressurized fluid between the bearing ring and static ring may flow to the air knife through an opening in the bearing ring. In some instances, the pressurized fluid between the bearing ring and static ring may be allowed to exit through an air groove between the bearing ring and static ring to allow for a predetermined pressure to be maintained.

In addition to the air knife, the sensor clearing system may include additional components such as a heater, blower, pump, nozzle, and one or more controllers. Each of these components may assist the air knife in removing debris and contaminants from sensor covers.

The features described herein may allow for clearing a sensor housing of debris. This, in turn, may allow for the continued use of a sensor even when the sensor's housing becomes dirty or wet due to the buildup of debris and/or contaminants. In other words, the sensor may continue operation without interruption or the need for an individual to manually clean the sensor, as the air knife may continually clean the sensor housing or clean the sensor housing when needed. As such, the vehicle may continually operate in environments which produce a lot of debris and contaminants, such as outdoors in the rain or snow or at construction sites or off-road locations. Moreover, the features described herein may clear sensor housings with irregular shapes or faceted surfaces, where other objects, such as wipers cannot reach. Additionally, the features described herein may not introduce a drag force onto the sensor housing. Thus, the features described herein may remove the need for a wiper to wipe debris and/or contaminants from the sensor's housing. As a result, fewer moving parts to clear the sensor housing may be needed. Moreover, the risk of scratches, wear marks, or blade material being introduced from a wiper dragging across the sensor housing may be eliminated. Additionally, the features described may clear the sensor without generating wiping noise, such as generated by a wiper blade rubbing on a sensor housing.

Example Systems

Figure 3:
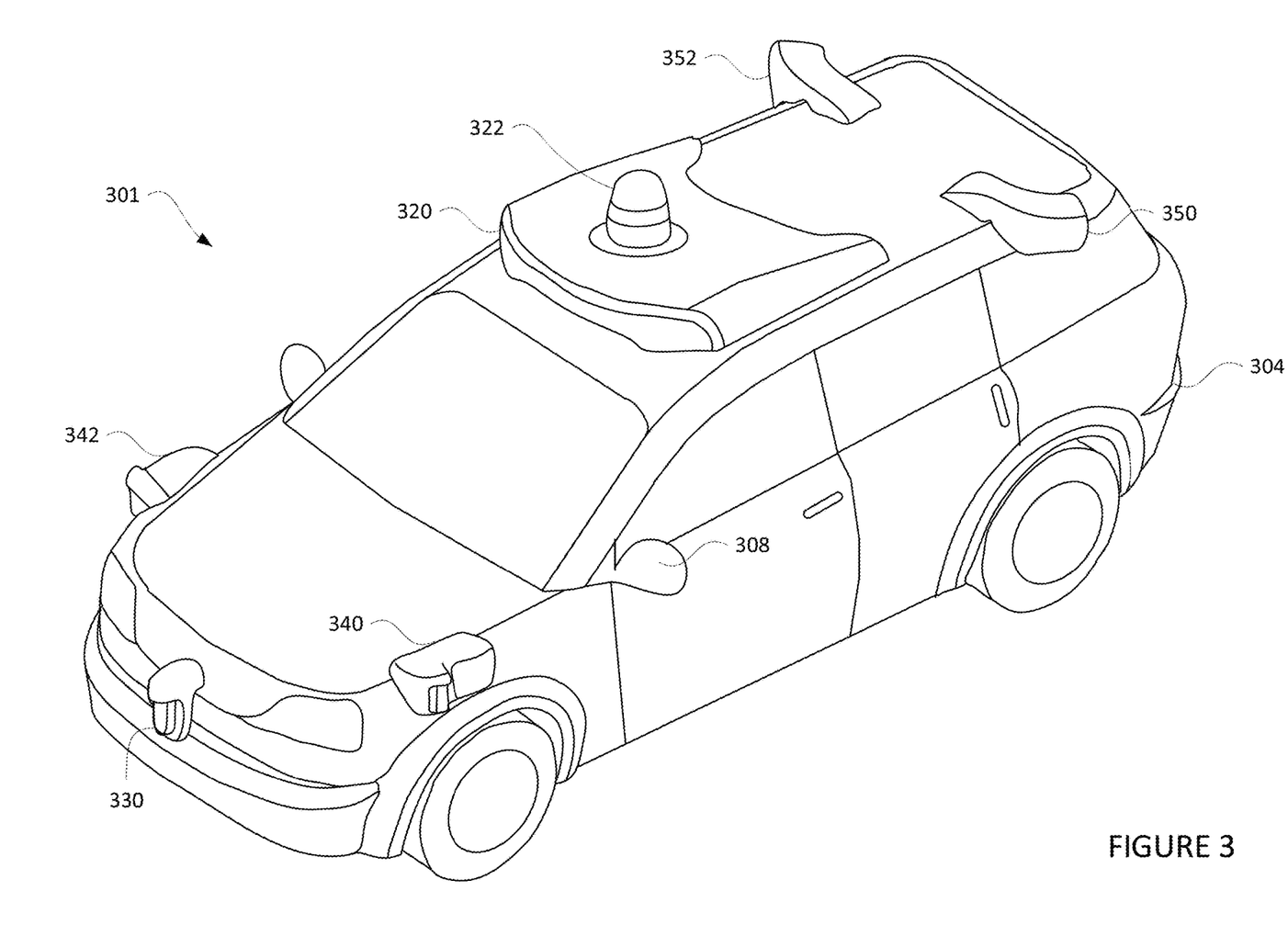
FIG. 3 illustrates a vehicle and sensor housings in accordance with aspects of the disclosure.

A vehicle may have one or more sensors to detect objects external to the vehicle such as other vehicles, obstacles in the roadway, traffic signals, signs, trees, etc. For example, the vehicle 301, as shown in FIG. 3, may include sensors, such as sensor 101 in FIGS. 1A and 1B. Such sensors may include lasers, sonar, radar, cameras and/or any other detection devices that capture images and record data which may be processed by computing devices within the vehicle. The vehicle's sensors, such as LIDAR, radar, cameras, sonar, etc. may capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to objects when needed.

The sensors may be arranged around the vehicle's exterior or interior. For example, housings 330, 340, 342, 350, 352 may include, for example, one or more LIDAR devices. The sensors may also be incorporated into the typical vehicle components, such as tail lights/turn signal lights 304 and/or side view mirrors 308. In some instances a laser, radar, sonar, camera or other sensors may be mounted on the roof, such as in housing 322, attached to mount 320.

While certain aspects of the disclosure are particularly useful in connection with specific types of vehicles, the vehicle may be any type of vehicle including, but not limited to autonomous and semi-autonomous, as well as manually driven and/or operated, cars, trucks, motorcycles, busses, boats, airplanes, helicopters, lawnmowers, recreational vehicles, amusement park vehicles, farm equipment, construction equipment, trams, golf carts, trains, and trolleys. Moreover, the aspects of the disclosure may be useful in connection with objects other than vehicle's, such as wearable sensors, telephones, and other such objects which are subjected to debris and contaminants.

Figure 4:
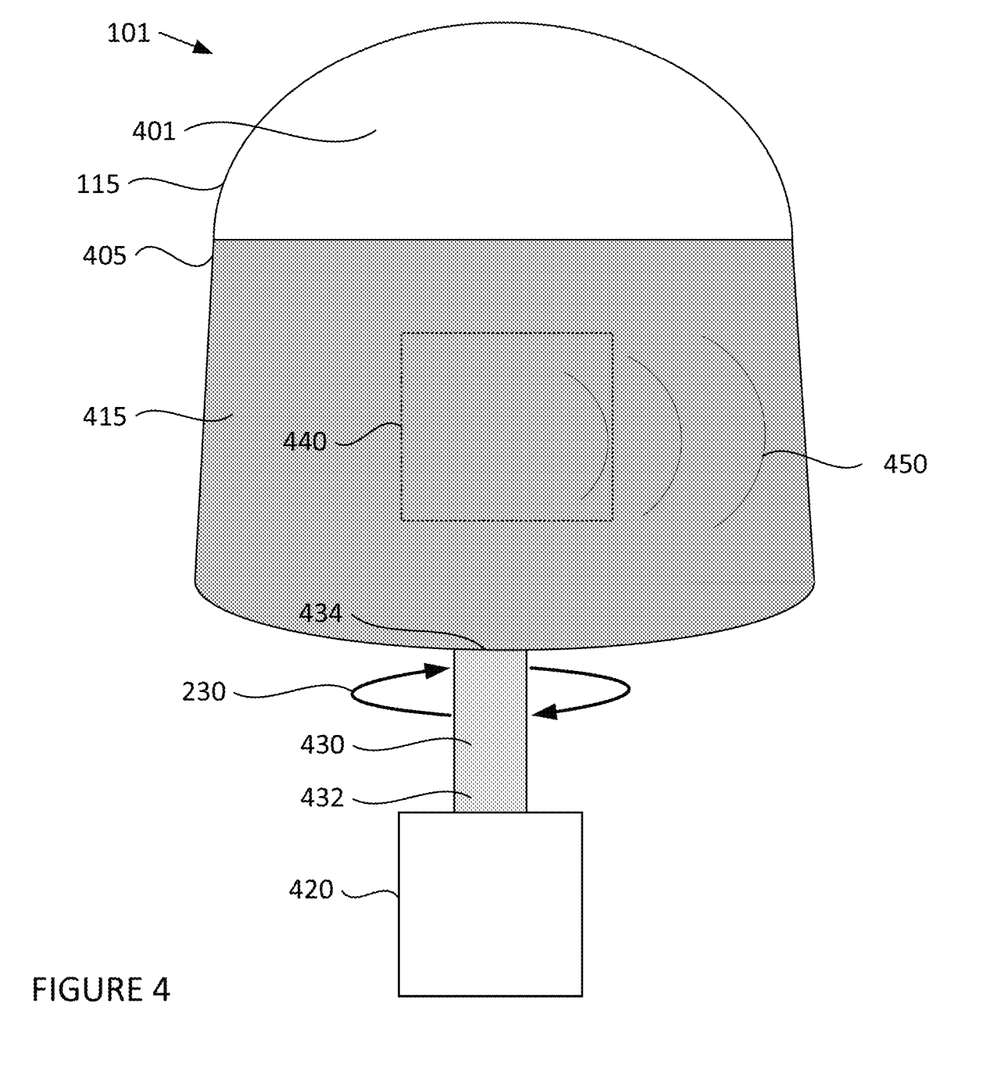
FIG. 4 shows a sensor attached to a motor in accordance with aspects of the disclosure.

A vehicle sensor, such as sensor 101, may be comprised of internal sensor components 440, a sensor housing 115 for housing the internal sensor components, and a cover window 415, as shown in FIG. 4. The cover window may be constructed at a specific location on the sensor housing 115 and the internal sensor components 440 may transmit and receive one or more signals through the cover window (as illustrated by markings 450). The sensor housing may be configured in various shapes and sizes. As further shown in FIG. 4, the sensor housing 115 may be configured such that it has a domed shaped portion 401 with a side wall 405 in the shape of a frustum. The sensor housing 115 may be comprised of materials such as aluminum, magnesium, steel, plastic, glass, polycarbonate, polystyrene, acrylic, polyester, etc.

In some instances, the sensor housing 115 may not completely cover the sensor. In this regard, the sensor housing 115 may cover only a portion of the internal sensor components 440, while uncovered portions of the internal sensor components may be within a vehicle, such as vehicle 301, or open to the environment external to the sensor. The sensor housing 115 may include one or more openings to the external environment or to the vehicle 301.

The sensor housing 115 may include a cover window through which the internal sensor components may transmit and receive signals. For instance, as further shown in FIG. 4, the entire side wall 405 of the sensor housing 115 may be constructed as a cover window 415, to allow signals, such as signals 450, to penetrate the sensor housing 115. Although the entire side wall 405 is shown as being the cover window 415, in some instances only a portion or portions of the sidewall may be constructed as cover windows. The cover window 415 may be composed of the same, or different, material as the sensor housing 115. In some instances the entire sensor housing 115, or a large portion of the sensor housing, may be penetrable by the signals transmitted and received by the internal sensor components 440, thereby allowing the entire sensor housing 115 to function as a cover window.

The sensor may be attached to a motor via a sensor shaft. For instance, as further shown in FIG. 4, the sensor shaft 430 may include a first end 432 and a second end 434. The first end of the of a sensor shaft 432 may be attached to a sensor motor 420 and the opposite end of the sensor shaft 434 may be connected to the sensor 101 and sensor housing 115. In this regard, the first end of the sensor shaft 432 may be attached to the motor 420 via a belt, gear, chain, friction roller, etc. The motor 420 may rotate the sensor shaft 430 in the first direction 230 causing the entire sensor 101 to also rotate in the first direction. In some embodiments the sensor shaft 434 may only rotate the sensor housing 115. The sensor 101 and motor 420 may each be located internally or externally from a vehicle, such as vehicle 301.

An air knife, such as air knife 220 in FIGS. 2A and 2B, may be constructed from one or more pieces of metal, plastic, or other such materials capable of withstanding high pressures, such as 8 PSI, or more or less. For instance, the air knife may be constructed from steel, aluminum, magnesium, ABS polycarbonate, polyurethane, polyethylene, polypropylene, polyamide, polyacetal, PVC, carbon fiber, etc.

The air knife may be configured such that a pressurized fluid input into the air knife is directed out of the air knife in a particular location. In this regard, pressurized fluid may be received at the input of the air knife, such as from an air pump, described herein. The pressurized fluid may flow through an internal chamber within the air knife and be directed to an output section of the air knife, where the pressurized fluid is then output.

Figure 5A:
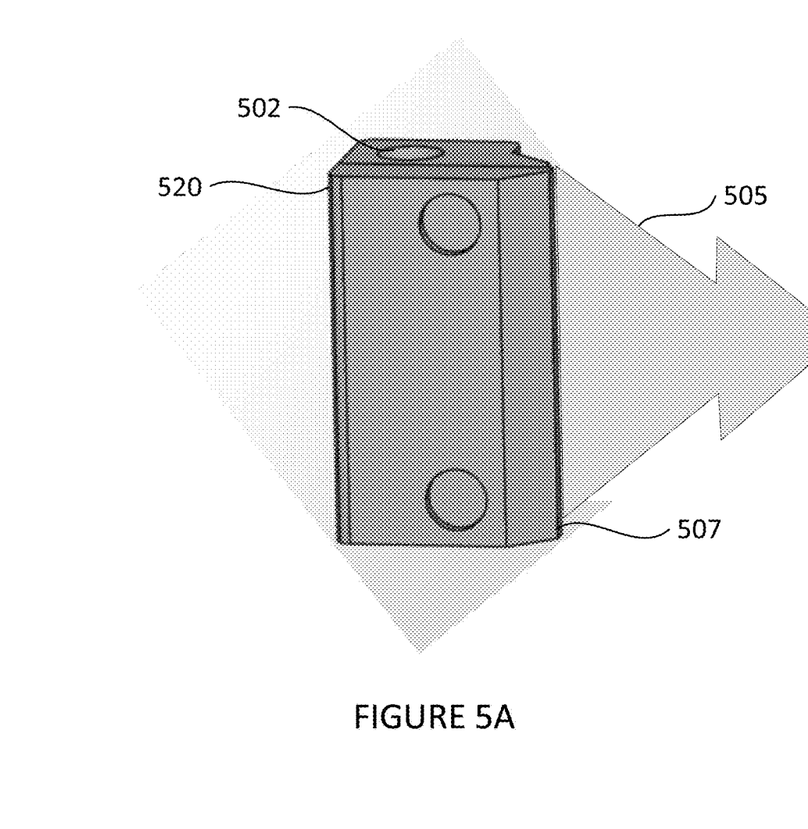
FIGS. 5A and 5B are illustrations of air knives in accordance with aspects of the disclosure.

The air knife may be configured such that a pressurized fluid output from the air knife is directed in a particular direction out from the output section of the air knife. In this regard, the output of the air knife may be configured such that the pressurized fluid is released from the entire face of the output section or in sections spread across the face of the output section. For instance, FIG. 5A shows an air knife 520, which may be compared to air knife 220 and which is configured to output pressurized fluid (as represented by arrow 505) across the face of the output section 507. In this regard, the full stream air knife may include an input 502 and an output section 507, as further shown in FIG. 5A. Pressurized fluid may be guided through an interior channel (not shown) from the input 502 to the output section 507. Upon pressurized fluid reaching the output section 507, the air knife 520 may release the pressurized fluid as a stream from across the entire face of the output section 507, as represented by arrow 505. Thus, the released pressurized fluid 505 is sprayed perpendicular to the direction of the output section 507.

Figure 5B:
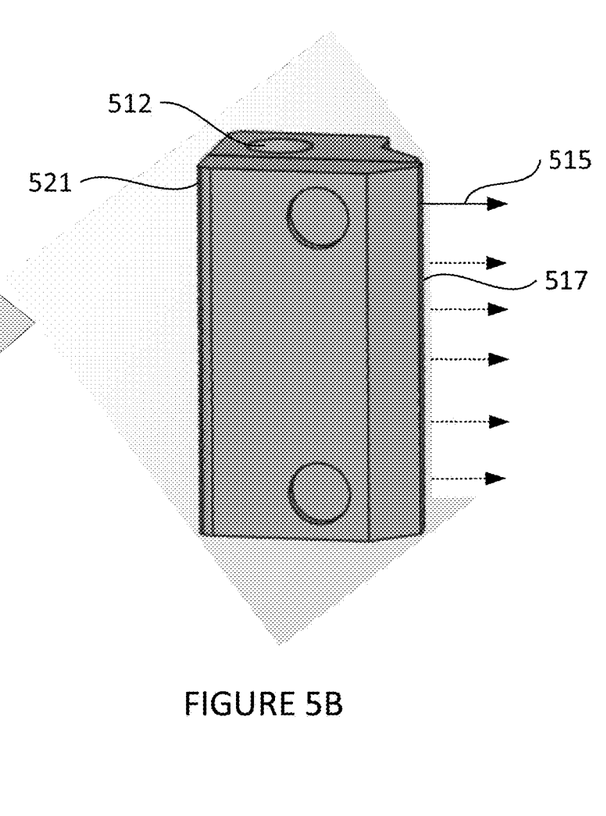

FIG. 5B shows a segmented air knife 521, which may be compared to air knives 220 and 520 and which is configured to output pressurized fluid 515 in sections spread across the face of the output section 517. In this regard, the segmented air knife may include an input 521 and an output section 517, as further shown in FIG. 5B. Pressurized fluid may be guided through an interior channel from the input 512 to the output section 517 having a plurality of segments. The segments may be formed by one or more shelves (i.e., any type of dividing structure) within the interior of the output section 517. The number of segments may be based upon the number of the shelves within the segmented air knife 521.

Figure 5C:
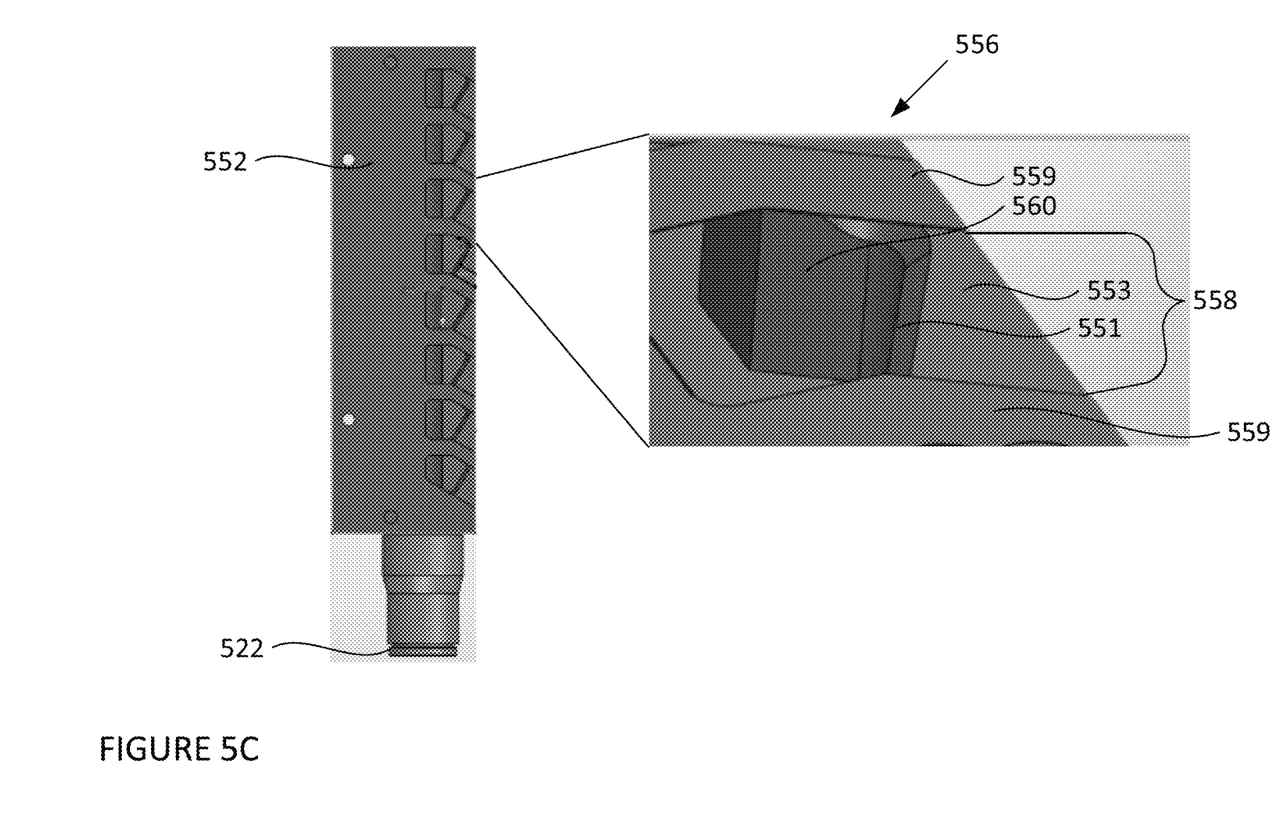
FIG. 5C is an illustration of the interior of an air knife in accordance with aspects of the disclosure.

In some instances, the shelves of a segmented air knife may be directed downward, upward, perpendicular, or in any other direction relative to the sensor housing 115. In this regard, as the pressurized fluid travels through a segment of the segmented air knife 521, it is directed, in sections by way of the segments and shelves, downward, upward, perpendicular, or at a different angle, relative to the sensor housing 115, without requiring the segmented air knife to be tilted. For instance, FIG. 5C illustrates an enlarged, cutaway view of air knife 552 and an enlarged view of segment 556 of segmented air knife 552, which may be compared to air knives 220, 520, and 521. The air knife 552 includes angled shelves 553 and input 522. As seen in the enlarged view, the segment 556 is formed between shims 559. The output channel 558 of segment 556 includes a lead-in chamfer 551. The chamfer and the steps 560 (e.g., changes of height within the channel,) are shaped such that there is a variation in the flow resistance through the channel from the top of the channel to the bottom. The channel shape 558, defined by the shims 559 and the angled shelves 553, may cause a shear gradient that bends the pressurized fluid downward as it exits the air knife.

Figure 6:
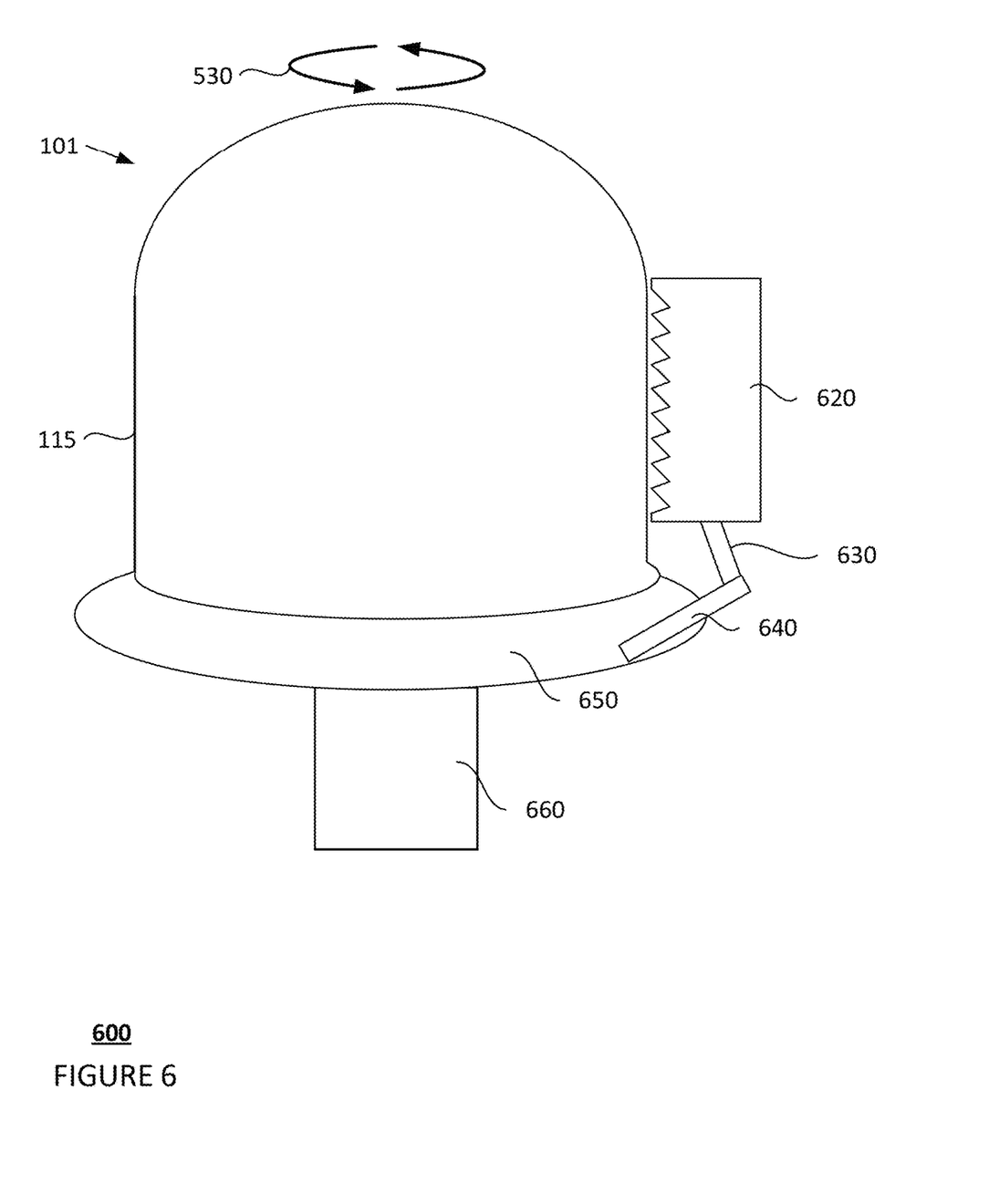
FIG. 6 is an illustration of a sensor clearing system in accordance with aspects of the disclosure.

The air knife may be attached to a motor to rotate the air knife around the sensor such that pressurized fluid output from the air knife clears some or all of the sensor housing of debris. For instance, and as shown in sensor clearing system 600 in FIG. 6, an air knife arm 630 may be connected to a support 640 which is connected to a bearing including a bearing ring 650. The bearing ring 650 may be rotated by a motor 660 in the first direction 530. Although FIG. 6 illustrates the air knife 620 being connected to the bearing ring and motor via an air knife arm 630 and support 640, the air knife 620 may be connected directly to the bearing ring 650 and/or motor 660. In some instances, the air knife arm 630 and support 640 may be the same component. The air knife 620 may be rotated partially or fully around the sensor 101 and in the first direction 530, or a second, opposite direction. In some embodiments the bearing ring may be a rolling element bearing.

The bearing ring 650 may cause the support 640, air knife arm 630, and air knife 620 to rotate around the sensor housing 115 of sensor 101, as further shown in FIG. 6. As the air knife 620 rotates around the sensor housing 115, the air knife 620 may output pressurized fluid to certain locations, or all, of the sensor housing 115 to clear debris. The air knife 620 may be rotated in the same direction or a different direction than the rotation of the sensor and/or sensor housing 115. In some instances, the sensor and/or sensor housing may remain stationary. More than one air knife may be attached to the motor and rotated around the sensor 101 to clear the sensor housing 115.

In some instances, the bearing may be an air bearing. The air bearing may include a static ring onto which the bearing ring may be positioned. For instance, and as shown in the top down view of an air bearing in FIG. 7A, the static ring 702 may be positioned around sensor 101. Bearing ring 701 may be positioned over the static ring 702, as further shown in FIG. 7A. Air knife 720, which may be compared to air knives 220, 520, and 620, may be mounted to the bearing ring 701. The bearing ring 701 may rotate around the sensor 101 in a first direction 530, thereby rotating the air knife 720 around the sensor 101, as further shown in FIG. 7A.

Figure 7A:
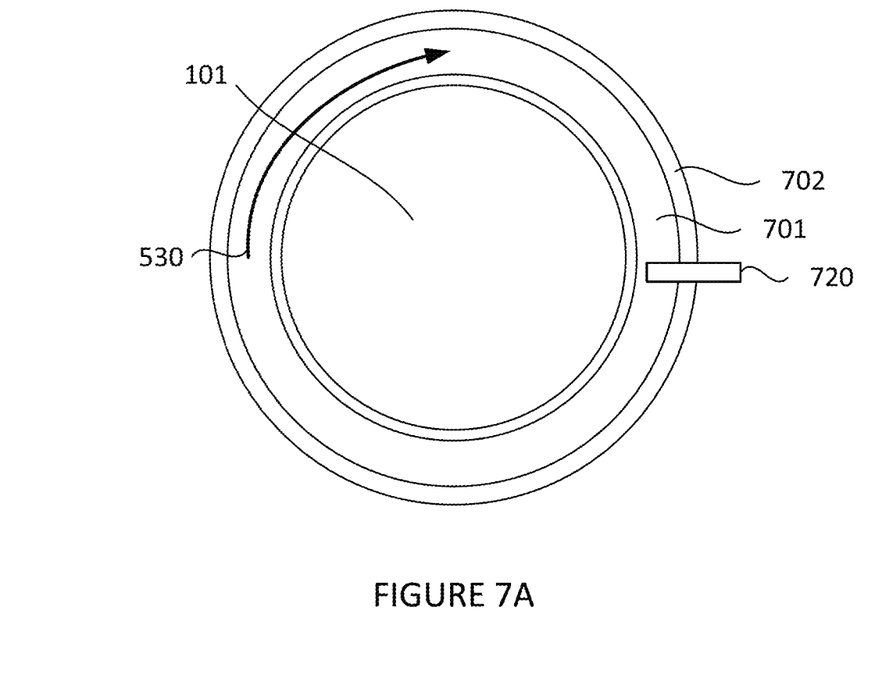
FIG. 7A is an illustration of an exterior, top view of an air bearing and sensor in accordance with aspects of the disclosure.
Figure 7B:
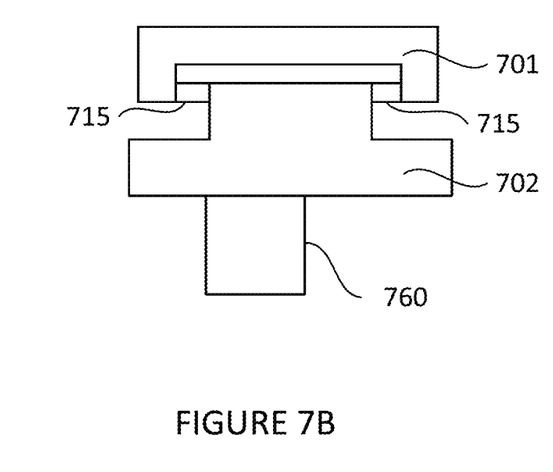
FIG. 7B is an illustration of an air bearing and friction wheels in accordance with aspects of the disclosure.

A motor may drive the rotation of the bearing ring. In this regard, the motor may be attached to a driving mechanism, such as friction wheels which are in contact with the bearing ring. As the motor rotates the friction wheels, the bearing ring may be forced to rotate in the first direction 530, as shown in FIG. 7A. For instance, and as shown in the side, cutaway view of the static ring 702 and bearing ring 701 in FIG. 7B, friction wheels 715 may be mounted on or near the static ring 702 such that they are in contact with the bearing ring 701. A motor 760 may be mounted in the vicinity of the static ring 702 and coupled to the friction wheels 715, via a drive, such as a belt, chain, shaft, etc., such that the motor can drive the rotation of the friction wheels 715. Although FIG. 7B illustrates the motor 760 being mounted to the bottom of the static ring 702, the motor may be mounted in any location where it is capable of being coupled to the friction wheels 715. Although FIG. 7B illustrates frictions wheels 715 initiating the rotation of the bearing ring 701, other driving mechanisms may be used in place of the friction wheels 715, such as a direct drive shaft coupled to the bearing ring 701. In some instances, the motor elements may be integrated into the bearing rings or other neighboring structures. For example, the motor stator components (e.g. electric coils or other such components) may be attached to the static components and the motor rotor components (e.g. magnets, electric coils, etc.,) may be attached to the rotating components, or vice-versa.

Figure 8:
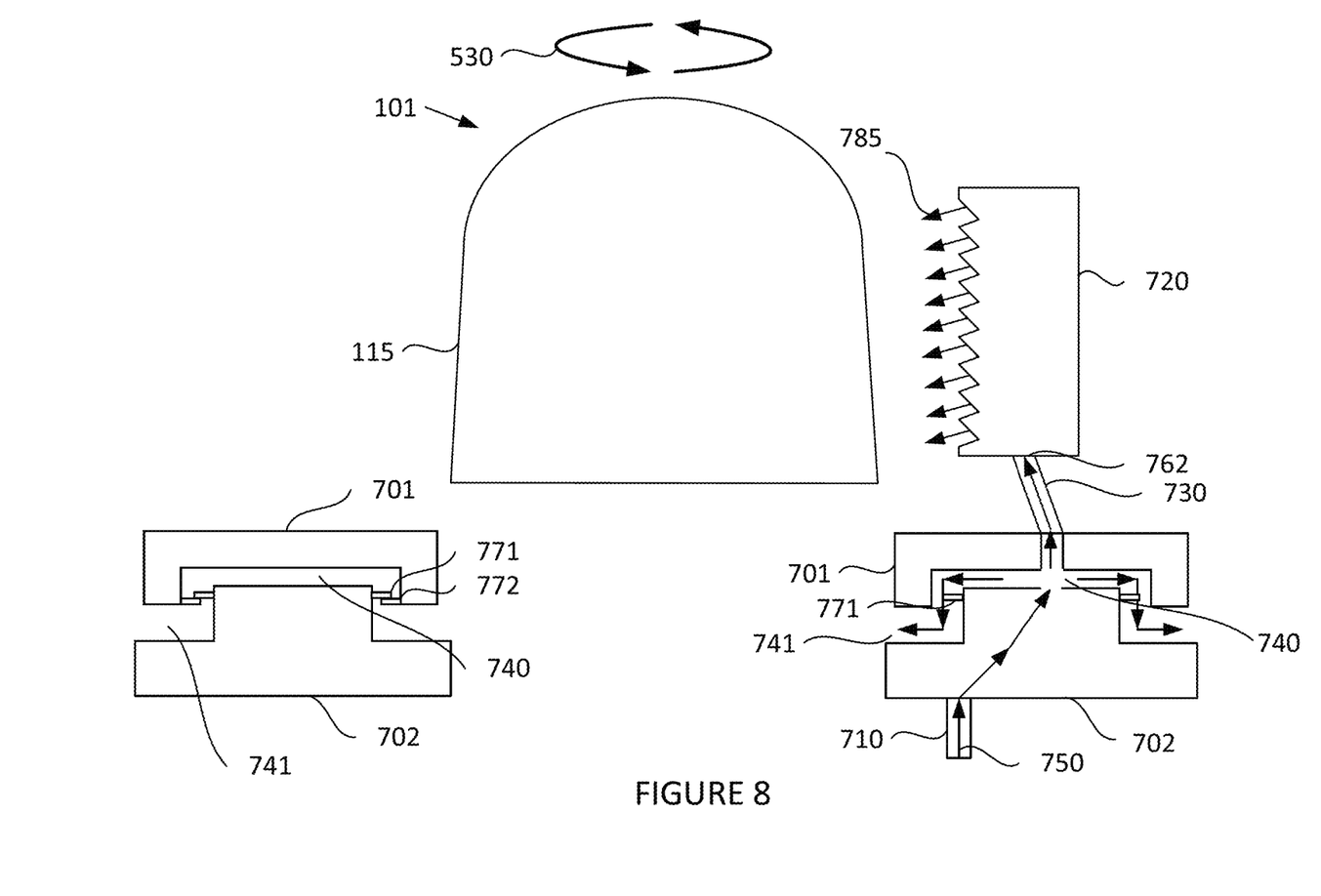
FIG. 8 is an illustration of the operation of a sensor clearing system having an air bearing accordance with aspects of the disclosure.

During operation of the sensor clearing system 600 having an air bearing, pressurized fluid may be input into a channel positioned between the bearing ring and the static ring to force the bearing ring apart from the static ring. In this regard, and as shown in FIG. 8, the static ring 702 may include an input 710 where pressurized fluid 750 (illustrated as arrows) may be received and output into the channel 740. In this regard, the pressurized fluid 750 may move through an interior conduit (not shown) in the static ring 702 and be output into the channel 740 to force separation of the bearing ring 701 and the static ring 702.

The channel may have an air groove to allow leakage of the pressurized fluid. In this regard, the channel 740 may include an air groove 741, where pressurized fluid 750 may be leaked out of the channel 740 to maintain a predefined pressure within the air bearing. In this regard, the pressurized fluid 750 may have a pressure of 30 PSI, or more or less, and the pressurized fluid leaked out of the air groove 741 may be 2 PSI, or more or less. In some instances, the bearing may include one or more seals in the form of o-rings, lip-seals, labyrinth, narrow-gap, or similar that create a sealed cavity between the bearing ring and static ring.

The air knife 720 may receive pressurized fluid from the air bearing. In this regard, the air knife 720 may be mounted to the bearing ring 701 via a mounting arm 730. The interior of mounting arm 730 may include a conduit through which pressurized fluid 750 may be transported from the channel 740 through an opening in the bearing ring 701 to an input of the air knife 762, as further shown in FIG. 8. The pressurized fluid may then be output by the air knife 720 towards the direction of the sensor housing 115 of sensor 101, as illustrated by arrows 785.

The distance of separation between the static ring 702 and the bearing ring 701 may be limited by blocking elements. In this regard, upon the pressurized fluid forcing separation of the bearing ring 701 from the static ring 702, the bearing ring 701 may move in a vertical direction relative to the static ring 702. To prevent the bearing ring 701 from separating too far from the static ring 701, blocking elements 771 and 772, attached to the bearing ring 701 and static ring 702, respectively, may make contact, thereby preventing further separation. As further shown in FIG. 8, blocking element 771 may be positioned around the entirety of the static ring 702. As such, the blocking element 772 of the bearing ring 701, which may be constructed in only portions of the bearing ring, will contact blocking element 771 regardless of the rotational position of the bearing ring 701. Although blocking element 772 is shown as being positioned around the entirety of the static ring 702, blocking element 772 may be constructed in only portions of the static ring 702 and blocking element 771 may be constructed around the entirety of the bearing ring 701. The blocking elements may include anti-friction materials, components such as roller bearings, or static structures.

Figure 9:
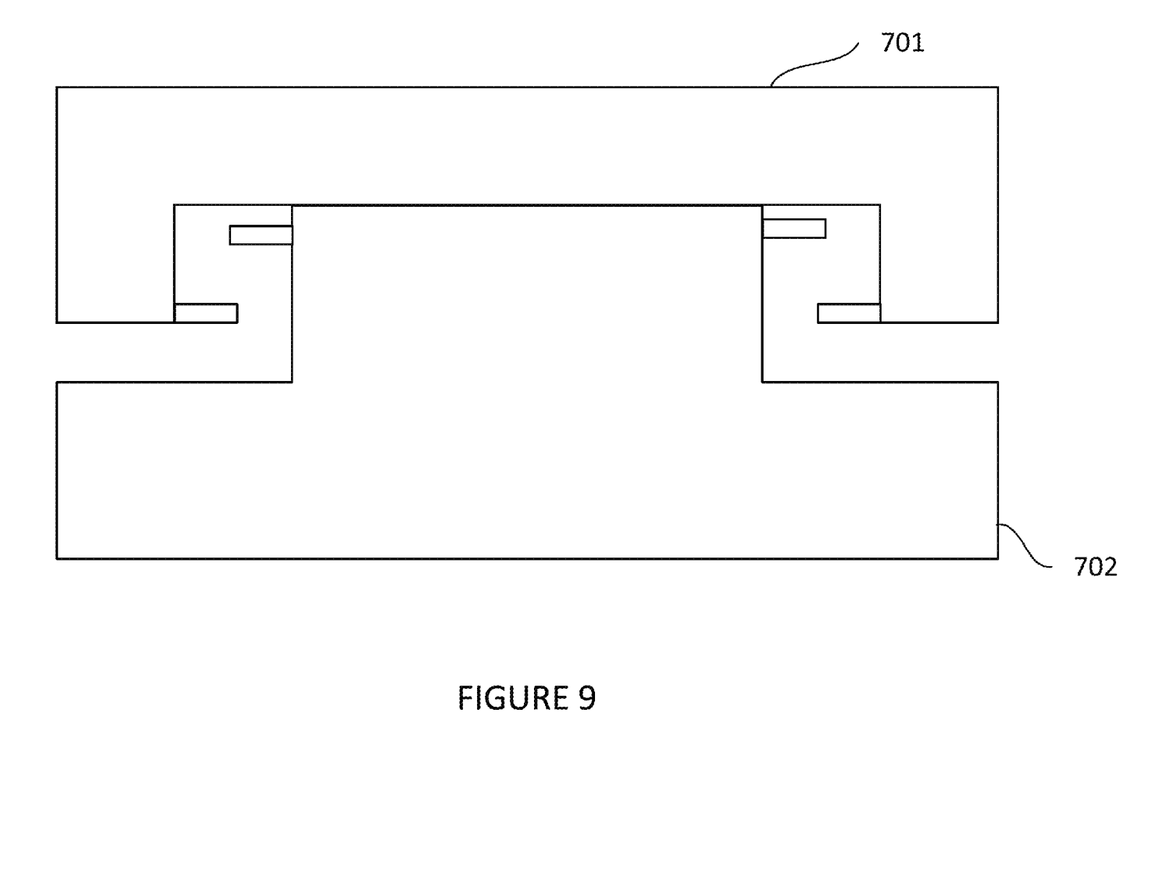
FIG. 9 is an illustration of air bearing in a rest position in accordance with aspects of the disclosure.

Upon the sensor clearing system ceasing operation, the bearing ring 701 may rest upon the static ring 702. In this regard, and as illustrated in the cutaway view of the bearing ring 701 and static ring 702 in FIG. 9, once pressurized fluid is no longer introduced into the system, there may not be sufficient or any force that would cause a separation between the bearing ring 701 and static ring 702. As such, gravity results in the bearing ring 701 resting upon the static ring 702. In some instances, a support may be provided which maintains causes the bearing ring 701 to maintain a certain distance from the static ring 702.

Figure 10A:
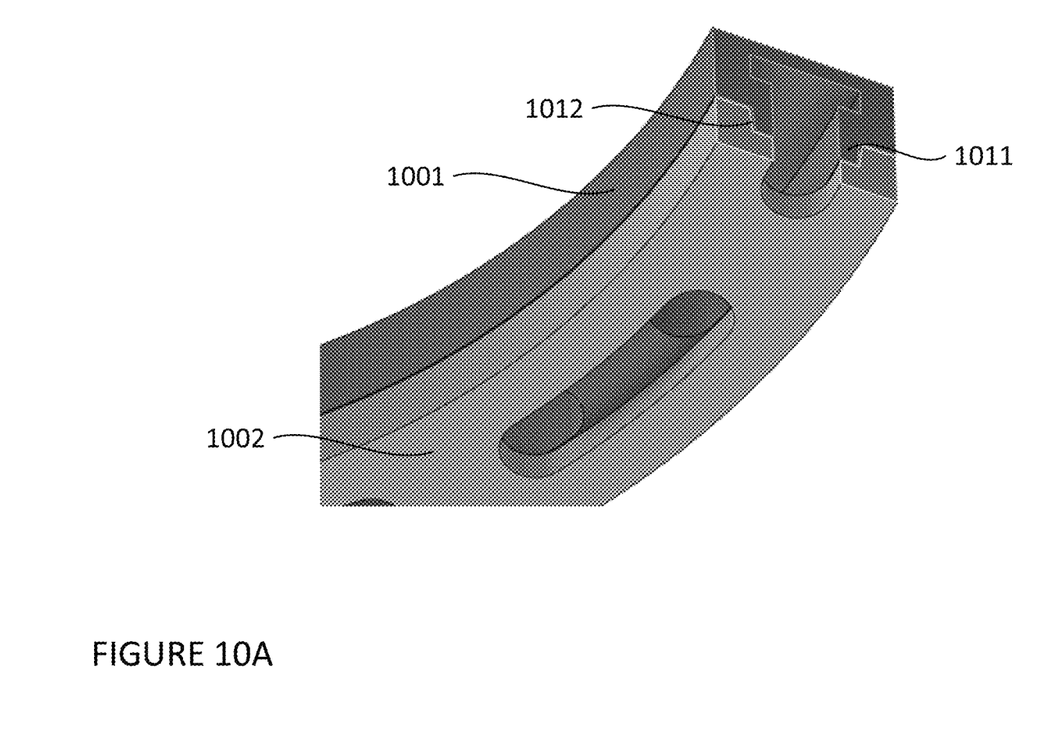
FIGS. 10A-10C are illustrations of an air bearing in accordance with aspects of the disclosure.

The bearing ring may be positioned such that it sits at least partially within the static ring. For instance, and as shown in the cutaway view of an air bearing in FIG. 10, the bearing ring 1001 may have a t-shape, such that the base 1011 of the bearing ring fits within a groove 1012 on the static ring 1002. By positioning the bearing ring 1001 within the static ring 1002, lateral movement of the bearing ring may be minimized. In some instances, bearings, such as ball bearings) may be positioned between the bearing ring 1001 and static ring 1002.

Figure 10B:
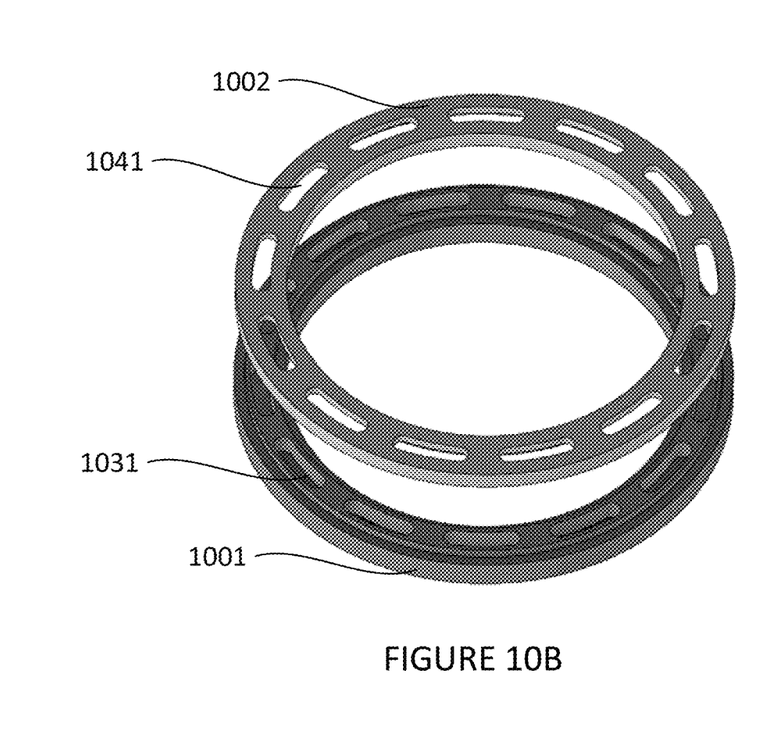
Figure 10C:
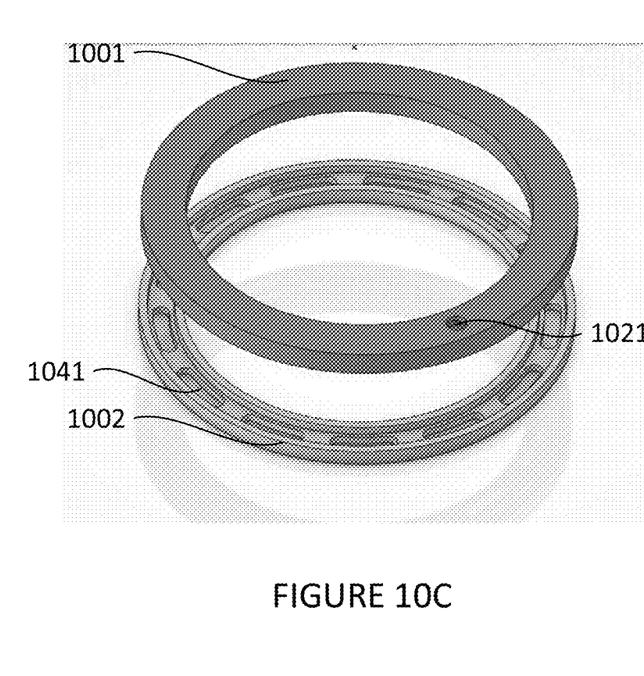

Slots may be integrated into the top of the static ring 1002 and the lower portion of the bearing ring 1001 may provide a passageway for pressurized fluid from a source to an air knife or other device. For instance, and as shown in the bottom and top view of the air bearing in FIGS. 10B and 10C, respectively, the static ring 1002 may include a plurality of slots 1041 positioned around its surface. Bearing ring 1001 also includes a plurality of slots 1031. Upon pressurized fluid being introduced into the air bearing through slots 1041, the pressurized fluid may travel through the slots of the bearing ring 1031, resulting in the bearing ring 1001 lifting off of the static ring 1002. The pressurized fluid within the bearing ring 1001 may then travel out of the air bearing through outlet 1021, where an air knife or connector may be connected to receive the pressurized fluid. The pressurized fluid may be provided into the air bearing via a plenum chamber or other such source.

Figure 11:
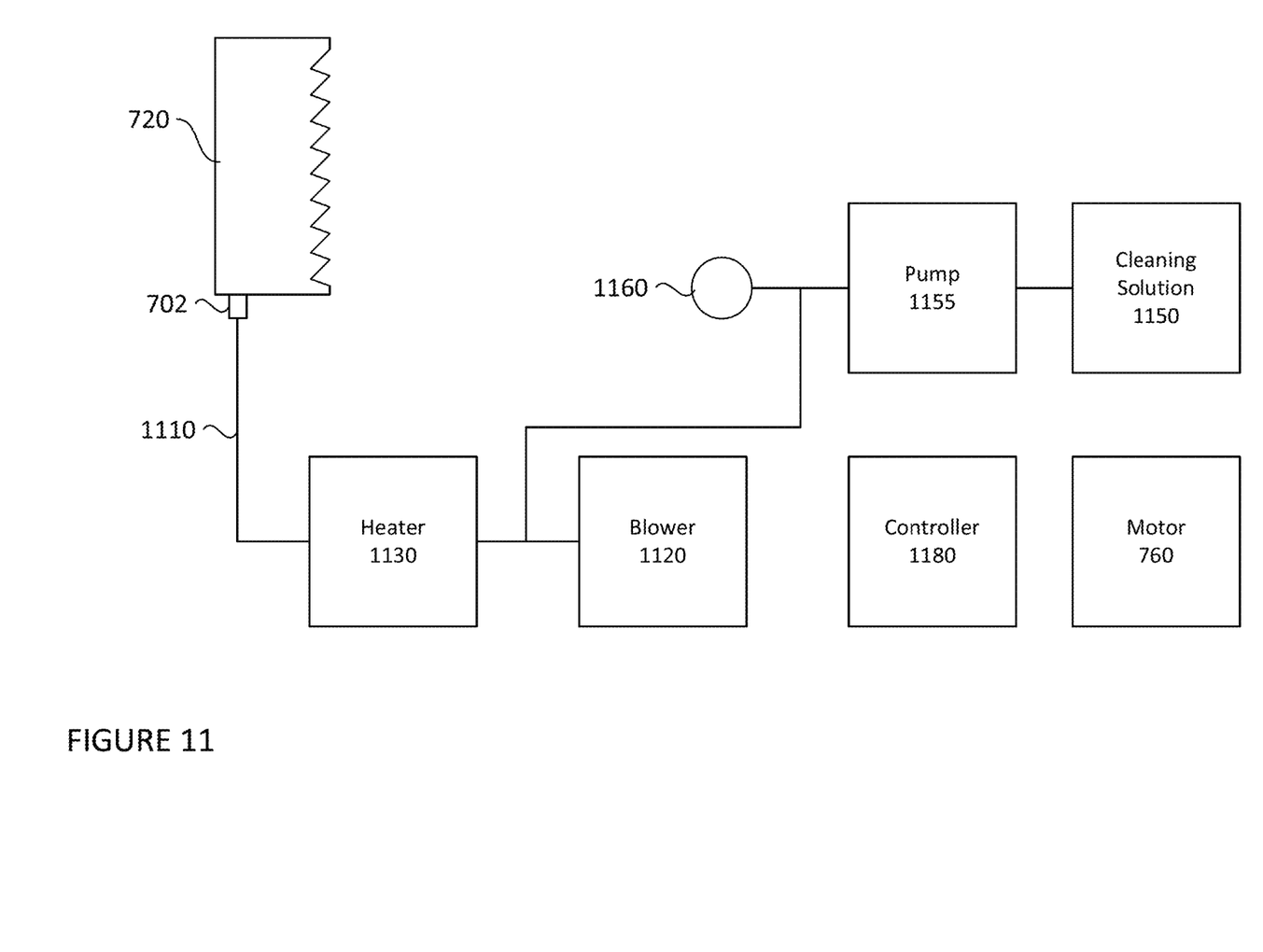
FIG. 11 is a schematic of a sensor clearing system having a controller in accordance with aspects of the disclosure.

The sensor clearing system 600 may also include a fluid source. For example, and as shown in FIG. 11 a conduit 1110, such as rubber or plastic tubing, may be connected on one end to an input of the air knife. The other end of the conduit 1110 may be connected to a blower 1120. The blower 1120 may include a pump, a compressor, or other source of pressurized fluid, such as canned gas. The blower 1120 may output a pressurized fluid through the conduit and into the air knife. Additionally, the blower 1120 may provide the pressurized fluid into the channel 740. The air knife 720 may then output the pressurized fluid at a particular location and in a particular direction, as discussed herein. In some instances the blower 1120 may be constructed within the air knife. In instances where an air bearing is utilized, pressurized fluid within the channel 740 may be provided by the fluid source, and passed to the air knife 720 through the mounting arm 730 or another such conduit.

The fluid may be any type of fluid capable of being pressurized. For instance, the fluid may be compressed and/or pressurized. For instance, the fluid may be air, helium, oxygen, nitrogen, carbon dioxide, combustion engine exhaust, or other such fluid.

A heater or heat exchanger may be used to warm the pressurized fluid as it travels from the blower to the air knife. For example, as further shown in the example system of FIG. 11, the heater 1130 may be attached to a conduit 1110 and positioned between the air knife 720 and blower 1120. In this regard, as the pressurized fluid travels from the blower 1120, through conduit towards the air knife 720, the heater 1130 may heat the pressurized fluid. As such, the pressurized fluid may be heated and, when output by the air knife, the heated, pressurized fluid may be sprayed onto the sensor housing. In this regard, debris and contaminants such as ice, snow, and/or condensation built up on the housing may be melted as well as blown off. In some instances, a cooler (not shown) may be used to cool the pressurized fluid prior to being output by the air knife.

Cleaning solution may be used to assist the air knife in removing debris and contaminants. For instance, a pump 1155 may pump a cleaning solution 1150 into a nozzle or jet. The nozzle 1160 may then apply the cleaning solution, such as water, anti-freeze, detergent, alcohol, solvent, and/or soap, onto the sensor housing to assist in the removal of the debris and contaminants from the sensor housing. In some instances, the cleaning solution 1150 may be pumped into the air knife 720, such that as the air knife outputs the cleaning solution in addition to the pressurized fluid. The amount of cleaning solution output by the nozzle and/or air knife, as well as the timing of the application of the cleaning solution may be controlled by selectively powering the pump on and off as necessary.

The sensor clearing system may include a controller 1180, such as one or more microprocessors, processors, computer devices, etc. which may control the operation of components of the air knife system. In this regard, the controller may be connected to the pump, heater, and blower, as well as other components of the system, such as the debris sensor and/or monitoring sensor. Upon receiving a signal to engage, or determining that the system should engage based on data received from sensors such as a debris sensor, the controller may trigger one or more components of the air knife system to engage.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Referring back to FIG. 11, a controller, such as one or more microprocessor, processors, computer devices, etc. may control the operation of components of the sensor clearing system 600. In this regard, the controller 1180 may be connected via wire or wirelessly (not shown) to the air knife 720, motor 760, pump 1155, heater 1130, and blower 1120, as well as other components of the system, such as a debris sensors and/or monitoring sensors. Upon receiving a signal to engage, or determining that the system should engage based on data received from sensors such as the debris sensor, the controller 1180 may trigger one or more components of the air clearing system 400 to engage. For instance, the controller 1180, upon determining a sensor housing, such as sensor housing 115, is dirty, may trigger the blower 1120 and motor 760 to engage resulting in the air knife 720 outputting a stream of pressurized fluid around the sensor housing 115. In the event the sensor housing remains dirty, the controller may trigger the pump 1155 to spray cleaning solution 1150 onto the sensor housing 115. Upon the sensor housing being cleared of the dirt and debris, the controller may disengage the components of the sensor clearing system. In some instances, the controller may receive ambient temperature data relative to the vehicle's exterior to determine whether the heater 1130 should be engaged or disengaged during the operation of the sensor clearing system. In this regard, should the ambient temperature be below a threshold, such as 40 degrees Fahrenheit, or more or less, the controller may trigger the heater to engage when the blower 1120 is engaged.

In some instances the controller may receive a signal from a manually operated input, such as a switch, button, lever, etc. In response to the received signal, the controller 1180 may engage or disengage the sensor clearing system 600.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A sensor clearing system for cleaning a sensor, the sensor including a sensor housing, and the system comprising:
   an air knife configured to clear the sensor housing of debris;
   a bearing comprising a bearing ring arranged over a static ring, wherein the air knife is attached to the bearing ring; and a motor, wherein the motor is configured to rotate the bearing ring completely around the sensor housing, and wherein when pressurized fluid is introduced into a channel between the bearing ring and the static ring, the pressurized fluid causes the bearing ring to lift away from the static ring such that the bearing ring floats above the static ring.

2. The system of claim 1, wherein the air knife includes:
   an input for receiving the pressurized fluid; and
   an output section for providing the pressurized fluid against the sensor housing.

3. The system of claim 2, further comprising a blower, wherein the blower provides the pressurized fluid to the input of the air knife.

4. The system of claim 3, further comprising a heater disposed between the air knife and the blower, wherein the heater heats the pressurized fluid.

5. The system of claim 1, further comprising one or more friction wheels in contact with the bearing ring, wherein the motor is configured to rotate the one or more friction wheels and the friction wheels rotate the bearing ring.

6. The system of claim 1, wherein the static ring includes an input for receiving the pressurized fluid; and
   an output section for providing the pressurized fluid into the channel.

7. The system of claim 1, wherein the channel includes one or more air grooves through which pressurized fluid leaks to maintain the pressurized fluid at a predetermined pressure.

8. The system of claim 1, wherein a separation distance of the bearing ring and static ring is limited by one or more blocking elements.

9. The system of claim 1, wherein the air knife includes an input for receiving the pressurized fluid, and
   wherein the input is connected to the channel to allow pressurized fluid to flow from the channel to the input.

10. The system of claim 1, wherein the air knife is configured to clear the sensor housing by providing the pressurized fluid against the sensor housing in a substantially downward direction relative to the face of the air knife.

11. A vehicle comprising the system of claim 1, wherein the sensor housing is mounted to the vehicle.

12. The system of claim 8, wherein a first of the one or more the blocking elements is positioned around an entirety of the static ring, and a second of the one or more the blocking elements is positioned in only a portion of the bearing ring such that the second of the one or more of the blocking elements will be limited by the first of the one or more blocking element regardless of a rotational position of the bearing ring.

13. The system of claim 8, wherein a first of the one or more the blocking elements is positioned around an entirety of the bearing ring, and a second of the one or more the blocking elements is positioned in only a portion of the static ring such that the second of the one or more of the blocking elements will be limited by the first of the one or more blocking element regardless of a rotational position of the bearing ring.

14. The system of claim 8, wherein the one or more blocking elements includes an anti-friction material.

15. The system of claim 8, wherein the one or more blocking elements includes a roller bearing.

16. The system of claim 8, wherein the one or more blocking elements includes a static structure.

17. The system of claim 8, wherein a first of the one or more blocking elements is attached to the bearing ring and a second of the one or more blocking elements is attached to the static ring.

18. The system of claim 1, wherein each of the bearing ring and the static ring are arranged 360 degrees around the sensor housing such that the air knife is arranged to rotate 360 degrees around the sensor housing.

* * * * *